United States Patent
Wehner et al.

[11] 3,913,099
[45] Oct. 14, 1975

[54] AUTOMATIC, DIGITALLY CONTROLLED RADAR TARGET MATCHED FILTER

[75] Inventors: Donald R. Wehner, San Diego; Michael J. Prickett, Santee; Raymond B. Gylling, San Diego, all of Calif.

[73] Assignee: The United States of America as represented by the Secretary of the Navy, Washington, D.C.

[22] Filed: June 24, 1970

[21] Appl. No.: 49,376

[52] U.S. Cl. .......................... 343/5 SA; 343/17.1 R
[51] Int. Cl.² ........................ G01S 9/06; G01S 7/30
[58] Field of Search .............. 343/5 SA, 17.1, 13 R; 340/3 R

[56] References Cited
UNITED STATES PATENTS

| | | | |
|---|---|---|---|
| 2,817,832 | 12/1957 | Mathes............................. | 343/13 R |
| 3,064,234 | 11/1962 | Barrett.............................. | 340/3 R |
| 3,212,053 | 10/1965 | Finney............................... | 340/3 R |
| 3,391,403 | 7/1968 | Phillips, Jr. ...................... | 343/17.1 R |
| 3,636,562 | 1/1972 | Wehner.......................... | 343/17.1 R |

Primary Examiner—Maynard R. Wilbur
Assistant Examiner—G. E. Montone
Attorney, Agent, or Firm—R. S. Sciascia; G. J. Rubens; H. Fendelman

[57] ABSTRACT

An automatic, digitally controlled apparatus for improving radar target recognition and identification capabilities of high-range resolution radars. A transmitted high-range resolution pulse train produces a complex echo signal from a target illuminated thereby. The echo signal from the target illuminated consists of a series of discrete RF response pulses reflected from the scatter centers on the target. Each scatter center produces a reflected RF pulse response that is separated in time with respect to the other RF pulses an amount proportional to the position of its corresponding scatter center on the target with respect to the other scatter centers. Each response is processed in a different one of a plurality of delay channels having a variable delay element that is responsive to digital control signals. By selectively energizing each delay element in the delay channels, the RF pulses or responses received first are delayed until the last RF pulse or response in each echo signal is received. The processed response from each of the scatter centers can then be combined such that the combined peak response from the target will comprise an algebraic superposition of the individual responses from the scatter centers. Stored digital control signals based upon a priori target range profile signature data and corresponding to matched conditions for known targets are applied to the delay channels so that when the response from the target under surveillance matches to a matched condition for a known target, the target under surveillance is thereby identified.

3 Claims, 4 Drawing Figures

AUTOMATIC, DIGITALLY CONTROLLED RADAR TARGET MATCHED FILTER

STATEMENT OF GOVERNMENT INTEREST

The invention described herein may be manufactured and used by or for the Government of the United States of America of governmental purposes without the payment of any royalties thereon or therefor.

BACKGROUND OF THE INVENTION

In conventional radar systems, radar back-scatter from radar targets is equal to the vector sum of the phase and amplitude of the back-scatter from the scattering objects or centers on a target. The well-known scintillation phenomena is caused by variation of the phases of the individual echo signals as the aspect of the target changes slightly and also by modulation of the back-scatter from individual scattering objects.

The advent of high-range resolution radar (range resolution less than several feet) makes it possible to resolve individual scatter centers on targets and to locate and measure modulation effects. The resulting correlation to the target geometry and reduced scintillation effect suggest high-range resolution radar as a means of classification and/or identification of uncooperative and cooperative targets to more effectively detect and identify the targets in high-clutter or noise environments.

Presently operational target identification techniques are not entirely radar functions, but rather some require specially coded transponders located on friendly targets which respond to radar signals by transmitting identification codes which must be interpreted by the radar receiver. Furthermore, all presently operational techniques for detection, tracking, and identification operate with relatively low bandwidth signals; that is, signals having pulse durations as long or longer than the targets illuminated.

High-range resolution radar is capable of resolving the numerous centers of radar back-scatter (scatter centers) on a particular target. Accordingly, by means of high-range resolution radar it is possible to increase the ability of radar to detect, track or identify targets for which there is certain a priori information relative to scatter centers associated with a particular target. Previous radars have not been capable of utilizing the scatter center position information inherent in many classes of targets. Thus it is necessary for effective identification of targets to provide automatic, digitally controlled means for algebraically adding or superimposing the responses from individual scatter centers on a single radar target to create a match to that target and a mis-match to jamming signals, clutter, or to other targets.

SUMMARY OF THE INVENTION

The invention comprises an automatic, digitally controlled system which can be utilized in high-range resolution radar systems to instantaneously superimpose radar returns from the individual scatter centers on a particular radar target to thereby facilitate and increase the effectiveness of radar target recognition and identification functions. Each microwave RF pulse or response reflected from each of the scatter centers on a target illuminated by a transmitted pulse is processed in a different one of a plurality of microwave delay channels. Each channel comprises a bank of delay lines and also a digitally responsive switch associated with each delay line. A digital control signal source is programmed to provide selectively predetermined digital control signals to each of the switches whereby selected ones of the delay lines in each channel are thus serially connected with respect to each other to provide a total delay in each channel equal to the sum of the selected delay lines. The delay selected in each channel is proportional to the distance between scatter centers on the target under investigation. By thus delaying each discrete RF pulse or response from each of the scatter centers a selectively predetermined amount, the RF pulses can be superimposed to thereby produce a resultant output or signature having a peak amplitude equal to the algebraic sum of the amplitudes of the discrete RF pulses. Stored digital control signals corresponding to matched conditions for known targets are applied to the delay channels so that when the response from the target under surveillance matches to a matched condition for a known target, the target under surveillance is thereby identified.

STATEMENT OF THE OBJECTS OF THE INVENTION

An object of the present invention is to provide an automatic, digitally controlled matched filter for use in high-range resolution radar system.

Another object of the present invention is to provide a radar target matched filter capable of increasing the ability of a radar system to detect, track or identify targets for which there is a certain a priori information.

Other objects and many of the attendant advantages of this invention will be readily appreciated as the same become better understood by reference to the following detailed description when considered in connection with the accompanying drawings.

DESCRIPTION OF THE PRINCIPAL EMBODIMENT

Figure 1:
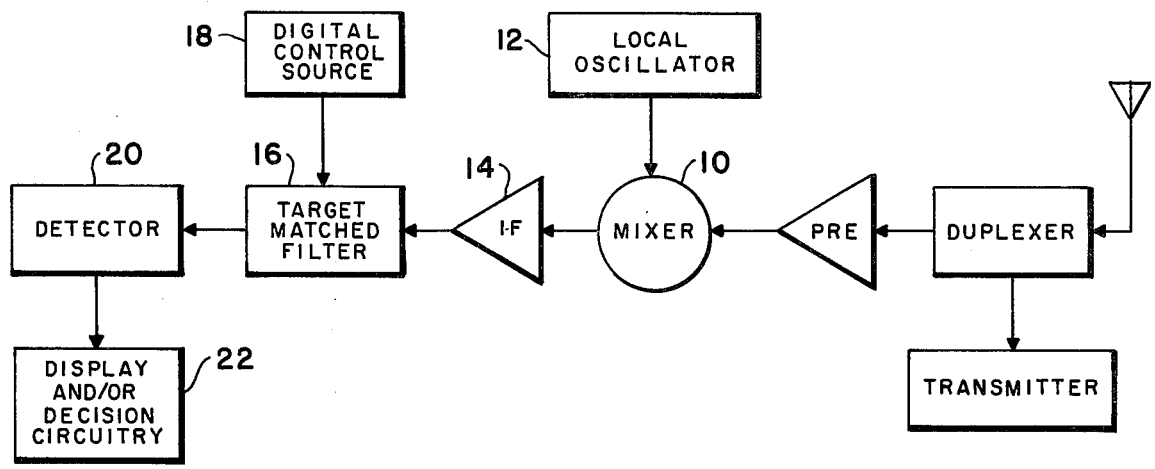
FIG. 1 is a schematic block diagram of a high-range resolution radar system incorporating the novel target matched filter of the present invention.

The essential elements of the radar receiver of FIG. 1 are those of a conventional range measuring system wherein a received signal is translated in a mixer 10 by a local oscillator 12 and the reduced frequency is amplified in an IF-amplifier 14 having a frequency high enough to contain the radar bandwidth. Normally the output of the amplifier is supplied to a detector, however in FIG. 1 the output of the amplifier 14 is coupled directly into the novel target matched filter which is to be described hereinafter. A digital control source 18 is connected to the target matched filter 16 to selectively provide digital signals for automatically controlling the filter in a manner to be described hereinafter. The output of the matched filter 16 is connected to a conventional microwave detector means 20. Display and/or decision circuitry 22 are connected to the detector means 20.

In operation the radar system of FIG. 1 transmits linear FM (chirp) signals thereby illuminating a remote target with high-range resolution pulses of predetermined bandwidth. Operation directly at the transmitter frequency is possible or an intermediate frequency can be used. However the bandwidth must be sufficient to pass high-range resolution pulses in either case.

Figure 2:
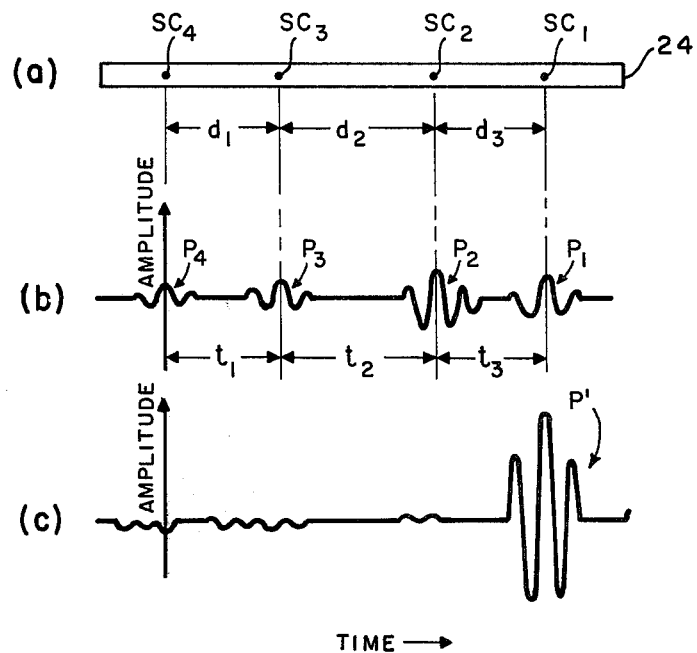
FIG. 2a is a simplified representation of an exemplary radar target having four scatter centers thereon.
FIG. 2b represents a typical undetected echo signature waveform characteristic of the target of FIG. 2a and consisting of the discrete response from each of the scatter centers on the target.
FIG. 2c represents the resultant output waveform derived by processing the return pulses of FIG. 2a through the matched filter of FIG. 3.

If an RF energy pulse train hits a target 24 having, for example, four scatter centers or scatter objects $SC_1$, $SC_2$, $SC_3$, and $SC_4$ located thereon as shown in FIG. 2a, the echo signal or signature reflected from the target will resemble the waveform shown in FIG. 2b, wherein the discrete RF pulses $P_1$, $P_2$, $P_3$, and $P_4$ represent the returns or responses from the scatter centers $SC_1$, $SC_2$, $SC_3$, and $SC_4$, respectively.

It should be noted that each response has a different amplitude directly related to the reflectivity of the corresponding scatter center, and that each pulse has a pulse width proportional to the radar range resolution. Finally it should be clearly understood and appreciated that the time periods $t_1$, $t_2$, and $t_3$ between the responses are directly proportional to the distances, $d_1$, $d_2$, and $d_3$, respectively, between the scatter centers.

Radar recognition and identification functions could be accomplished by comparing the echo waveform of FIG. 2b with previously obtained echo waveforms of known targets. However, it can be readily appreciated by those skilled in the art, that more effective recognition and identification can be obtained if instead of comparing a waveform consisting of a plurality of discrete pulses, a composite waveform or pulse $P_1$, as shown in FIG. 2c, representing the superposition of the discrete pulses $P_1$, $P_2$, $P_3$, and $P_4$, is compared against similar composite waveforms or signatures of known targets.

Figure 3:
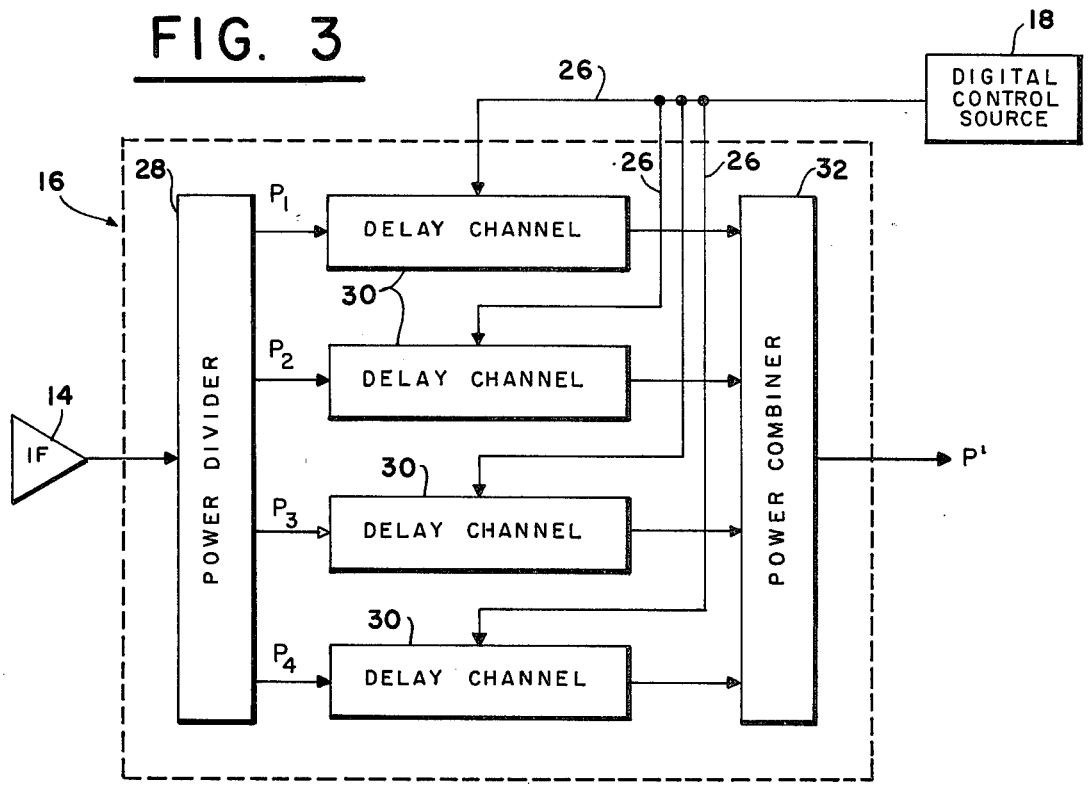
FIG. 3 is a simplified schematic of the target matched filter of the present invention; and, FIG. 4 is a simplified schematic of a typical microwave delay channel as shown in FIG. 3.

The simplified matched filter circuit shown in FIG. 3 is utilized in the present invention to process high-range resolution echo waveforms to produce composite waveforms of the type discussed above which can be compared with characteristic waveforms of known targets to indicate matched or mis-matched conditions in a manner to be described hereinafter with reference to FIGS. 3 and 4.

In FIG. 3, the characteristic echo waveform signal of FIG. 2b, for example, is divided into the four component, discrete RF pulses $P_1$, $P_2$, $P_3$, and $P_4$ by means of a conventional power divider 28. Each of the pulses $P_1$, $P_2$, $P_3$, and $P_4$ is fed to a different one of four identical microwave delay channels 30. Each of the microwave delay channels 30 essentially comprises a variable microwave delay line and associated switching circuitry which is responsive to digital control signals which are provided by the digital control source 18 to select the delay in each channel in a selectively predetermined manner. The digital control signals are applied to the switching circuitry of each channel through the conductors 26. The delayed outputs of the four delay channels 30 are combined by means of a conventional power combiner 32 to thereby produce a composite output waveform $P'$.

Each discrete RF pulse $P_1$, $P_2$, $P_3$, and $P_4$ is delayed in its corresponding delay channel an amount proportional to its physical position (location) on the target 24. For example, if $P_1$ is the first discrete pulse received, and $P_4$ is the last discrete pulse received from the target 24, it is obvious that if the pulses $P_1$ and $P_4$ are to be superimposed, $P_1$ must be delayed until $P_4$ is received. That is $P_1$ must be delayed an amount equal to $t_1 + t_2 + t_3$ which represents the time period between the pulses as shown in FIG. 2b. In a similar manner, pulse $P_2$ must be delayed an amount equal to $t_2 + t_1$, and pulse $P_3$ must be delayed an amount equal to $t_1$. It should be noted that the time delays $t_1$, $t_2$, and $t_3$ are directly proportional to the distances $d_1$, $d_2$, and $d_3$, respectively, between the four scatter centers on target 50.

Figure 4:
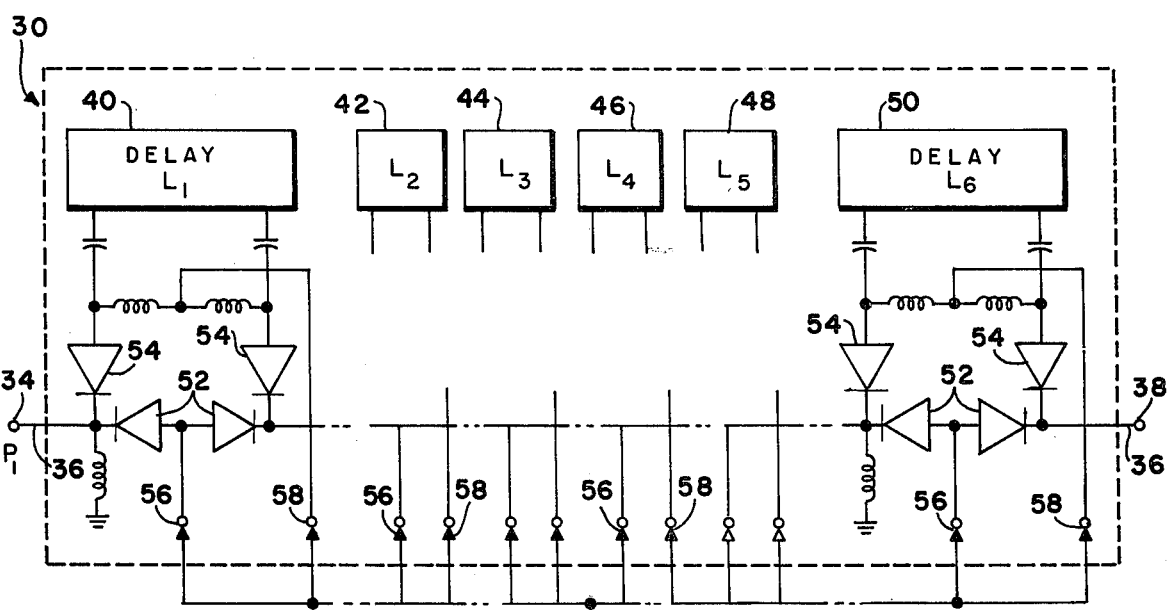

The required delay in each channel is achieved by means of the novel delay circuitry 30 shown in FIG. 4 which represents a simplified schematic of one of the four identical delay channels of FIG. 3. The delay technique of the present invention will be explained with reference to the pulse $P_1$ only since the technique is substantially similar for each of the channels.

In FIG. 4, the pulse $P_1$ is applied to the input terminal 34 of the delay channel 30. The delay channel 30 comprises a bank of microwave delay lines 40, 42, 44, 46, 48, and 50 having delay lengths $L_1$, $L_2$, $L_3$, $L_4$, $L_5$, and $L_6$, respectively. Obviously any number of delay lines can be used. Associated with each delay line is a switching circuit comprising a first and a second pair of PIN diode phase shifters 52 and 54. The switching circuit functions in reponse to digital control signals provided by the control signal source 18 to switch selectively predetermined ones of the delay lines which can, for example, comprise coaxial delay lines into a series connection with respect to each other.

If, for example, a digital "one" (1) from source 18 is applied to terminal 56 of delay line 40, the PIN diodes 52 are switched on, and thus pulse $P_1$ bypasses the delay line 40 and is directly coupled through conductor 36. If however a digital "zero" from source 18 is applied to terminal 58 of delay line 40, the pulse $P_1$ is coupled to the delay line 40 which has a delay length equal to $L_1$. Thus pulse $P_1$ is delayed a length equal to $L_1$.

In a similar manner, by selectively energizing any combination of the terminals 56, the pulse $P_1$ can bypass the corresponding delay lines 42, 44, 46, 48, and 50, and by selectively energizing any combination of the terminals 58, the pulse $P_1$ can be coupled to the corresponding delay lines 42, 44, 46, 48, and 50. Conductor 26 can, for example, feed a six-bit control word from digital control source 18 to the delay channel 30. Obviously any combination of the six delay lines can thus be obtained. For example, if a digital word 100110 is applied to the switching circuitry of FIG. 4, the total delay obtained will be equal to the sum of $L_1 + L_4 + L_5$.

Thus any combination of the six delay lines in channel 30 can be selected to produce a total delay equal to, for example, the delay $d_1 + d_2 + d_3$ previously stated as being necessary to coherently add pulse $P_1$ and pulse $P_4$.

The over-all response $P'$ produced at the output of the power combiner 32 of FIG. 3 is shown in FIG. 2c. As can be seen, the response consists of an RF pulse $P'$ whose amplitude is equal to the algebraic sum of the amplitudes of $P_1$, $P_2$, $P_3$, and $P_4$. The response $P'$ also includes a number of smaller time sidelobes. It should be noted that any other target having differently spaced scatter centers will not match to the filter to thus produce the signal response waveform P' which is characteristic of the target 50 which produced the return pulses $P_1$, $P_2$, $P_3$, and $P_4$. The resultant waveform obtained at the output of the microwave power combiner 32 can be then applied directly to a conventional radar detector 20.

By thus combining the various scatter center returns from a single target, a matched response characteristic of the particular target under investigation and of that target only is achieved. The resultant signal lends itself much more readily to detection and display and/or decision processing than the signature itself. It can readily be appreciated that without the novel invention, it would be necessary to separately analyze the four pulses $P_1$, $P_2$, $P_3$, and $P_4$ which comprise the signature of the target 50. By means of the novel invention only one waveform comprising the algebraic sum of the various scatter center return pulses need be processed and analyzed.

For example, in operation, the digital control course 18 stores a library of delay channel settings for known targets. That is, for the exemplary six-delay element channels of FIG. 3 and FIG. 4, the control source 18 stores a six-bit word for each channel for each known target against which it is desired to compare the target under surveillance. Thus as the target is illuminated, the control source 18 which can comprise a core memory or computer feeds the stored delay channel settings to the several delay channels thereby setting the delay channels, i.e., matched filter, to a matched condition corresponding to a particular known target. If the response from the target under surveillance matches the matched condition, the target is positively identified and such is indicated on suitable display circuitry 22. If the target response does not match, the source 18 provides another set of delay channel settings corresponding to another known target. The procedure is repeated until a matched condition between the target under surveillance and a known target is indicated.

In essence the invention creates a matched condition relative to the particular target under investigation and also presents a mis-match condition to jamming signals and clutter or to other targets.

The parameters of the system are determined by expected target length, radar range resolution, and radar frequency. The number of microwave delay channels required, $n$, is determined by the number of expected major scatter centers on the target. The number of bits required in each channel, N, must be large enough to permit delay variations fine enough to allow superposition of the discrete RF pulses to within 45° to 90° phase.

If each delay channel contains $2^N$ possible increments of delay, the smallest possible increment of delay variation is $1/2^N$. For the worst case of 90° phase matching, the smallest possible increment of delay variation is $L/\lambda_{0/4}$ where L is equal to the expected target length. For the worst case 45° phase matching, the smallest possible increment of delay variation is $L/\lambda_{0/8}$.

Obviously many modifications and variations of the present invention are possible in the light of the above teachings. It is therefore to be understood that within the scope of the appended claims the invention may be practiced otherwise than as specifically described.

What is claimed is:

1. A digital system for automatically identifying a remote radar target having a plurality of scatter centers comprising:
   microwave energy means for illuminating said target with a high-range resolution RF pulse train;
   receiver means for receiving reflected microwave energy from said target;
   said reflected microwave energy comprising a range profile signature of said target and consisting of a plurality of discrete RF pulses,
   each of said RF pulses corresponding to the energy reflected from one of said plurality of scatter centers of said target, and each of said RF pulses having a time-separation with respect to each other proportional to the physical separation of said scatter centers of said target;
   matched filter means connected to said receiver means,
   said filter means comprising a plurality of variable, microwave delay channels, and further including
   power divider means for coupling each of said discrete RF pulses to a different one of said delay channels,
   each of said delay channels comprising a bank of delay lines, each of said delay lines having a fixed delay and further including digital switch means associated with each of said delay lines;
   a source of digital control signals connected to said filter means,
   means for applying digital control signals from said source to energize selectively predetermined ones of said switch means to thereby connect in series the corresponding delay lines whereby in each channel a total delay is obtained which is substantially equal to the sum of the serially connected delay lines in that channel;
   each of said discrete RF pulses being delayed in its corresponding delay channel an amount substantially equal to said time-separation between said RF pulses; and
   means for coherently combining said time-delayed RF pulses to obtain an output waveform having an amplitude substantially equal to the sum of the amplitudes of the several discrete RF pulses.

2. Digitally-controlled, matched filter apparatus for use with high-range resolution radar systems wherein a remote target to be identified is illuminated with a pulse train to produce a target range profile signature return which is unique for the particular target under surveillance and comprising:
   power divider means for dividing said signature into the discrete, constituent responses thereof and produced by the individual scatter centers of said target;
   a plurality of like delay channel means,
   each of said channel means being connected to the output of said power divider means to receive a different one of said responses and comprising:
   input terminal means for receiving said response;
   output terminal means;
   a bank of microwave delay means connected between said input and output terminals;
   digitally-responsive switch means connected to each of said delay means;
   a source of digital control signals for energizing any of said switch means or any combination thereof whereby the corresponding delay lines are connected in a series manner with respect to each other between said input and output terminal means; and, power combiner means connected to the output of each of said delay channel means to combine the outputs thereof into a single composite output signal.

3. The apparatus of claim 2 wherein each of said delay means comprises a coaxial delay line and wherein each of said switch means comprises two pairs of PIN-diode phase-shifters connected across the input and output thereof.

* * * * *